United States Patent
Hoch et al.

(10) Patent No.: US 9,465,558 B2
(45) Date of Patent: Oct. 11, 2016

(54) DISTRIBUTED FILE SYSTEM WITH SPECULATIVE WRITING

(71) Applicant: Elastifile Ltd., Herzliya (IL)

(72) Inventors: Ezra N. Hoch, Tel-Aviv (IL); Eliyahu Weissbrem, Rehovot (IL)

(73) Assignee: ELASTIFILE LTD., Herzlia (IL)

( * ) Notice: Subject to any disclaimer, the term of this patent is extended or adjusted under 35 U.S.C. 154(b) by 108 days.

(21) Appl. No.: 14/595,234

(22) Filed: Jan. 13, 2015

(65) Prior Publication Data

US 2016/0202935 A1    Jul. 14, 2016

(51) Int. Cl.
*G06F 12/00* (2006.01)
*G06F 3/06* (2006.01)
*G06F 17/30* (2006.01)

(52) U.S. Cl.
CPC ........... *G06F 3/0667* (2013.01); *G06F 3/0604* (2013.01); *G06F 3/067* (2013.01); *G06F 17/30233* (2013.01)

(58) Field of Classification Search
CPC .... G06F 3/0667; G06F 3/0604; G06F 3/067; G06F 17/30233
See application file for complete search history.

(56) References Cited

U.S. PATENT DOCUMENTS

| 8,549,518 | B1 | 10/2013 | Aron et al. |
| 8,601,473 | B1 | 12/2013 | Aron et al. |
| 8,850,130 | B1 | 9/2014 | Aron et al. |
| 8,863,124 | B1 | 10/2014 | Aron |

OTHER PUBLICATIONS

StevenPoitras.com, "The Nutanix Bible", 54 pages, year 2014.
Hoch et al., U.S. Appl. No. 14/595,236, filed Jan. 13, 2015.

*Primary Examiner* — Gurtej Bansal
(74) *Attorney, Agent, or Firm* — D.Kligler IP Services Ltd.

(57) ABSTRACT

A method for data storage includes running on multiple interconnected compute nodes respective virtual heads that collaboratively store files in persistent storage. In response to receiving in an initiator virtual head a request to write at least a portion of a given file, the initiator virtual head selects one or more destination virtual heads for storing the portion. The portion is sent from the initiator virtual head to the selected destination virtual heads, and a notification of the selected destination virtual heads is sent to an owner virtual head, which has been assigned to own metadata of the portion. In the destination virtual heads, the portion received from the initiator virtual head is cached, and committed to the persistent storage only in response to receiving a commit instruction from the owner virtual head.

20 Claims, 2 Drawing Sheets

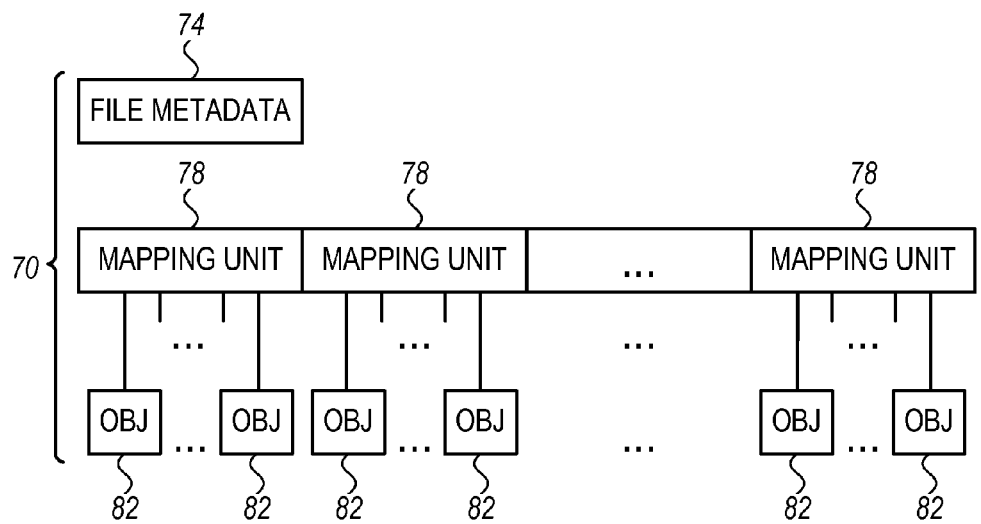
FIG. 2
FIG. 3
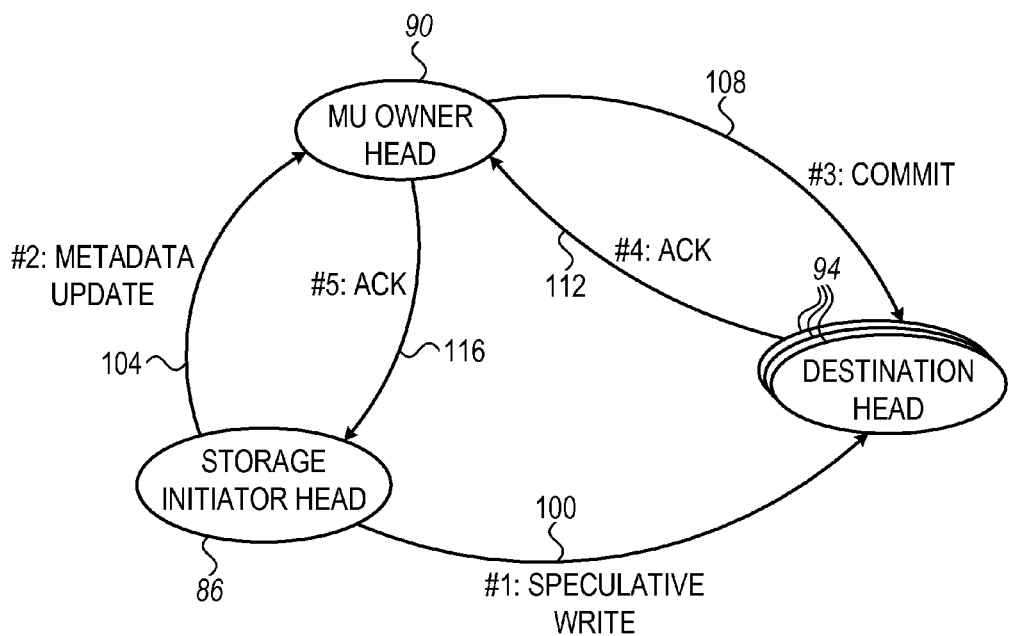

DISTRIBUTED FILE SYSTEM WITH SPECULATIVE WRITING

FIELD OF THE INVENTION

The present invention relates generally to data storage, and particularly to distributed file systems.

BACKGROUND OF THE INVENTION

Machine virtualization is commonly used in various computing environments, such as in data centers and cloud computing. A typical virtualized computing system comprises multiple compute nodes that are interconnected by a high-speed network. The compute nodes run Virtual Machines (VMs) that consume physical resources such as Central Processing Unit (CPU), memory, persistent storage and networking resources. Some computing systems use distributed File Systems (FSs) for persistent storage of files. Examples of distributed FSs include Google File System (GFS), Hadoop distributed file system (HDFS), Ceph, General Parallel File System (GPFS) and Lustre.

U.S. Pat. Nos. 8,863,124 and 8,601,473, whose disclosures are incorporated herein by reference, describe techniques for implementing I/O and storage device management in a virtualization environment. A Service VM is employed to control and manage various types of storage devices, including directly attached storage in addition to networked and cloud storage.

SUMMARY OF THE INVENTION

An embodiment of the present invention that is described herein provides a method for data storage, including running on multiple interconnected compute nodes respective virtual heads that collaboratively store files in persistent storage. In response to receiving in an initiator virtual head a request to write at least a portion of a given file, the initiator virtual head selects one or more destination virtual heads for storing the portion. The portion is sent from the initiator virtual head to the selected destination virtual heads, and a notification of the selected destination virtual heads is sent to an owner virtual head, which has been assigned to own metadata of the portion. In the destination virtual heads, the portion received from the initiator virtual head is cached, and committed to the persistent storage only in response to receiving a commit instruction from the owner virtual head.

In an embodiment, the method includes updating the metadata of the portion in the owner virtual head and sending the commit instruction to the selected destination virtual heads in response to the notification. In various embodiments, selecting the destination virtual heads includes choosing a set of the virtual heads that are topologically close to the initiator virtual head, choosing a set of the virtual heads that belong to different failure domains, and/or choosing a set of the virtual heads having non-congested network paths leading thereto from the initiator virtual head.

In other embodiments, selecting the destination virtual heads includes choosing a set of the virtual heads depending on actual loads on the virtual heads, free persistent storage space remaining on the virtual heads, respective latencies between the initiator virtual head and the virtual heads, respective network queue depths to the virtual heads, and/or characteristics of persistent storage devices of the virtual heads.

In an embodiment, sending the portion includes transferring the portion from the initiator virtual head to the destination virtual heads not via the owner virtual head. In a disclosed embodiment the method includes, in response to an event, re-selecting the destination virtual heads by the initiator virtual head, refraining from committing the portion by the originally-selected destination virtual heads, and instead committing the portion by the re-selected destination virtual heads.

In another embodiment the method includes, in at least one of the destination virtual heads, delaying committing of the portion until accumulating multiple commit instructions for multiple respective cached portions of one or more files, and then committing the accumulated cached portions. In an embodiment, the commit instruction from the owner virtual head carries metadata for storage, and committing the portion includes storing both the portion and the metadata in the persistent storage.

There is additionally provided, in accordance with an embodiment of the present invention, a system for data storage including multiple interconnected compute nodes. The compute nodes are configured to run respective virtual heads that collaboratively store files in persistent storage, to receive in one of the virtual heads serving as an initiator virtual head a request to write at least a portion of a given file, to select by the initiator virtual head, from among the virtual heads, one or more destination virtual heads for storing the portion, to send the portion from the initiator virtual head to the selected destination virtual heads and to send a notification of the selected destination virtual heads to an owner virtual head, which has been assigned from among the virtual heads to own metadata of the portion, and, in the destination virtual heads, to cache the portion received from the initiator virtual head and to commit the portion to the persistent storage only in response to receiving a commit instruction from the owner virtual head.

The present invention will be more fully understood from the following detailed description of the embodiments thereof, taken together with the drawings in which:

BRIEF DESCRIPTION OF THE DRAWINGS

FIG. 2 is a diagram that schematically illustrates a components of a file stored using a distributed file system, in accordance with an embodiment of the present invention; and FIG. 3 is a diagram that schematically illustrates a method for speculative writing in a distributed file system, in accordance with an embodiment of the present invention.

DETAILED DESCRIPTION OF EMBODIMENTS

Overview

Figure 1:
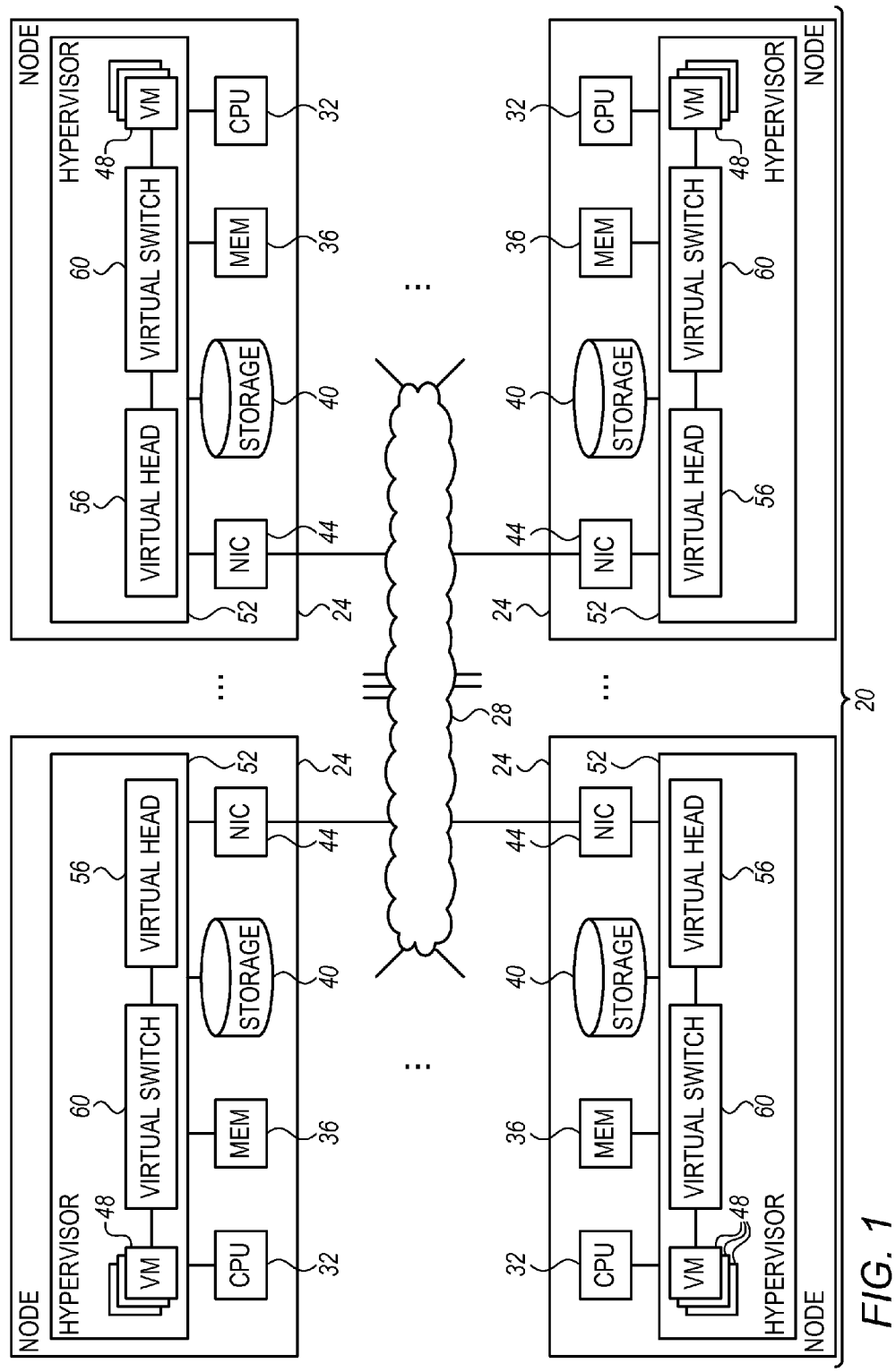
FIG. 1 is a block diagram that schematically illustrates a computing system, in accordance with an embodiment of the present invention.

Embodiments of the present invention that are described herein provide improved methods and systems for storage of files in compute node clusters. In the disclosed embodiments, a computing system, for example a data center, comprises multiple compute nodes interconnected by a network. At least some of the compute nodes comprise storage devices, e.g., Solid State Drives (SSDs), used for persistent storage of files. The compute nodes run respective virtual heads that collaboratively store files in the persistent storage.

In some embodiments, the virtual heads store data objects using a speculative writing process that is described in detail herein. The process typically begins with one of the virtual heads receiving a request from a client to store a data object of a file. This virtual head is referred to herein as an initiator head ("I-HEAD"). In response to the request, the I-HEAD selects one or more virtual heads for storing respective copies of the data object. These virtual heads are referred to herein as data store heads or destination heads ("D-HEADs").

The I-HEAD sends the data object to the D-HEADs for storage, and in addition sends a notification to a virtual head that owns the metadata for the data object. The latter virtual head is referred to herein as an owner head ("O-HEAD"). The O-HEAD updates the metadata accordingly, and sends a commit instruction to the D-HEADs. The D-HEADs commit the data object to the persistent storage only after receiving the commit instruction from the O-HEAD, not immediately upon receiving the data object from the I-HEAD.

The transaction described above is speculative in the sense that the selection of the D-HEADs by the I-HEAD is not finalized until the D-HEADs are instructed by the O-HEAD to commit the data object. If the transaction among the I-HEAD, O-HEAD and D-HEADs is broken for any reason, the I-HEAD is able to modify the selection of D-HEADs without impact on data consistency.

A central feature of the disclosed technique is that selection of the D-HEADs is performed by the I-HEAD (the virtual head serving the requesting client) and not by the O-HEAD (the virtual head owning the metadata of the data object). In many practical scenarios, the I-HEAD is in a much better position to select the D-HEADs than the O-HEAD. For example, the I-HEAD is better able to select the D-HEADs based on local information such as the current congestion or connectivity conditions. Such local information may not be available to the O-HEAD.

It is possible in principle to devise a solution in which the O-HEAD would select the D-HEADs, and the I-HEAD would then forward the data for storage to the selected D-HEADs. In such a solution, however, D-HEAD selection is most likely to be sub-optimal. Another possible solution is that all data for storage would be forwarded to the O-HEAD, which will in turn select D-HEADs and forward the data to them. Such a solution, however, would mean sending the data over twice the number of network links. In either case, performance would be severely compromised.

The speculative writing techniques described herein are thus highly efficient in storing data under rapidly varying network conditions. The performance benefit of the disclosed technique is especially significant, considering the fact that the traffic volume between the I-HEAD and the D-HEADS is much larger than the traffic volume between the I-HEAD and O-HEAD and the traffic volume between the O-HEAD and D-HEADs.

Various D-HEAD selection criteria are described below. Additional techniques, such as combined storage of data and metadata, and prolonged caching of data objects in the D-HEADs for improving efficiency, are also described.

The disclosed techniques are advantageous, for example, in full-mesh clusters (or nearly full-mesh clusters) in which all (or at least most) nodes can interact with all (or at least most) all nodes. The disclosed techniques are also advantageous, for example, when the network view is highly complex and/or highly variable over time. The disclosed techniques are also useful, for example, in heterogeneous systems and configurations that intermix various equipment types. Such conditions are common, for example, in large computer clusters in which hardware components are often replaced or refreshed. Nevertheless, the disclosed techniques are generally useful in any other suitable system configuration.

System Description

FIG. 1 is a block diagram that schematically illustrates a computing system 20, in accordance with an embodiment of the present invention. System 20 may comprise, for example, a data center, a cloud computing system or a computing system that performs any other suitable function.

System 20 comprises multiple compute nodes 24 that communicate with one another over a computer communication network 28. Compute nodes 24 are referred to herein as nodes, for brevity, and may comprise, for example, servers, workstations or any other suitable type of compute node. Nodes 24 may communicate over network 28 in accordance with any suitable network communication protocol, such as Ethernet or Infiniband. System 20 may comprise any suitable number of compute nodes. Nodes 24 may be collocated or located in multiple geographical locations. The collection of nodes 24 is also sometimes referred to as a cluster.

At least some of nodes 24 run clients, such as Virtual Machines (VMs) 48, which in turn run client applications. A given node 24 may run any suitable number of clients, and some nodes may not run clients at all. The description that follows refers mainly to virtualized environments in which the clients comprise VMs. Alternatively, however, the disclosed techniques can be used with various other suitable types of clients, such as OS containers, in either virtualized or non-virtualized environments.

In the present example, each node runs a hypervisor 52, a virtualization layer that mediates between the VMs and physical resources such as CPU, memory, storage and networking, and allocates such physical resources to the VMs. Hypervisor 52 may comprise, for example, VMWare ESXi, Microsoft Hyper-V, Citrix Xen, RedHat KVM, OpenStack, or any other suitable hypervisor.

In the example of FIG. 1, each node 24 comprises a CPU 32, a volatile memory 36 such as Random Access Memory (RAM), Non-Volatile RAM (NVRAM—not shown in the figure), one or more persistent storage devices 40 such as one or more Solid State Drives (SSDs) or Hard Disk Drives (HDDs), and one or more Network Interface Cards (NICs) 44. Hypervisor 52 allocates these physical resources to VMs 48 as needed. Generally, not every node necessarily comprises all types of physical resources. For example, some nodes may not comprise storage devices 40. Moreover, a given VM may utilize physical resources that do not necessarily reside locally on the node on which the VM runs.

In particular, hypervisors 52 of nodes 24 run software that jointly implements a distributed File System (FS) for providing file-level persistent storage for VMs 48 in storage devices 40. In some embodiments, the distributed FS is implemented using a respective virtual switch (VSW) 60 and a respective virtual head (VHEAD) 56, both comprising software modules that run on the respective hypervisor 52 of each node 24. Further aspects of the structure and functionality of this distributed FS are addressed in a U.S. patent application Ser. No. 14/595,236 entitled "Distributed file system for virtualized computing clusters,", whose disclosure is incorporated herein by reference.

VMs 48 and virtual heads 56 communicate with one another using file access commands of file-level network storage protocols. Example protocols include, for example, Network File System (NFS), Server Message Block (SMB) or object storage protocols such as Amazon S3. File access commands specify data in terms of file-level data structures such as paths, volumes, directories and filenames. It is important to distinguish the file access commands used herein from block-level commands and block-level storage solutions that specify data in terms of block addresses, e.g., physical addresses or Logical Block Addresses (LBAs).

The configurations of system 20 and nodes 24 shown in FIG. 1 are example configurations, which are chosen purely for the sake of conceptual clarity. In alternative embodiments, any other suitable system and/or node configuration can be used. The different elements of node may be implemented using suitable hardware, using software, or using a combination of hardware and software elements.

In some embodiments, CPUs 32 (which run hypervisors 52 including switches 60 and heads 56) comprise general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Speculative Writing in a Distributed File System

In some embodiments, each file in system 20 is divided into mapping units that are in turn divided into data objects. In addition, the file comprises file metadata. The data objects and metadata may be stored on storage devices 40 of one or more nodes 24, as desired.

FIG. 2 is a diagram that schematically illustrates a components of a file 70, in accordance with an embodiment of the present invention. Generally, the various files stored by the disclosed distributed file system have such a structure. File 70 comprises file metadata 74. The data, or content, of the file are arranged in one or more mapping units 78. Each mapping unit 78 is partitioned into multiple data objects 82, which comprise the actual data content of file 70.

In the present example, the size of each data object 82 is 4 KB, and the size of each mapping unit 78 is 1 MB. Alternatively, however, any other suitable sizes can be used. File metadata 74 may comprise information such as creation time, last access time, last modification time, user and group of the file, access permission bits and/or file size, as well as extended attributes such as whether the file is subject to compression, encryption, deduplication or other policies.

The data objects and file metadata of a given file may be replicated and distributed over multiple compute nodes 24. The virtual head 56 of a node 24 that stores a copy of a certain data object 82 is referred to as a data store head or destination head (denoted "D-HEAD") of that data object. In some embodiments, two or more replicated copies of a given data object may be stored on two or more respective D-HEADs, for redundancy and failure resilience.

The metadata relating to each mapping unit 78 is managed by a certain virtual head 56, which is referred to as the owner head (denoted "O-HEAD") of this mapping unit. Different mapping units 78 in a given file 70 may be owned by different O-HEADs. Any of virtual heads 56 may serve as the O-HEAD for various mapping units. In the description that follows, the terms "nodes" and "virtual heads" are sometimes used interchangeably for brevity.

In some embodiments, system 20 stores data objects using a speculative writing process that is carried out by virtual heads 56. In the description that follows, speculative writing is performed with data object granularity. Alternatively, however, the disclosed techniques can be implemented with any other suitable granularity that comprises at least a portion of a file.

FIG. 3 is a diagram that schematically illustrates a method for speculative writing, in accordance with an embodiment of the present invention. FIG. 3 shows a transaction that stores a given data object 82. A similar transaction is typically performed per data object or per batch of data objects. For example, each transaction may store a 32 KB chunk of data that comprises eight 4 KB data objects.

The transaction begins when a certain client, e.g., a certain VM 48, requests to write a data object belonging to a certain file. The client sends a write request to its local virtual head 56, which in the present scenario serves as an initiator virtual head 86 (denoted "I-HEAD"). The metadata of the data object is owned by a virtual head 56 that in the present scenario serves as an owner virtual head 90 (denoted "O-HEAD"). Typically, although not necessarily, the O-HEAD and I-HEAD comprise different virtual heads 56 in different nodes 24.

In response to the write request, I-HEAD 86 selects one or more D-HEADs 94 as candidates for storing respective copies of the data object. I-HEAD 94 may select D-HEADs 94 using any suitable selection criterion. The selection criterion may depend, for example, on the network connectivity and topology, e.g., on the topological relation between the D-HEADs and the I-HEAD and/or the topological relation amongst the D-HEADs. The selection criterion may give preference, for example, to D-HEADs that are topologically close to the I-HEAD or to D-HEADs that reside in different failure domains.

Other example selection criteria may depend on the actual network traffic conditions at the time of selection (e.g., D-HEADs that can be reached from the I-HEAD over non-congested network paths). Other possible selection criteria may depend on the actual traffic loads or congestion conditions on the D-HEADs, on the remaining free storage space on the different D-HEADs, on the latency to the various D-HEADs, and/or on the network queue depths to the various D-HEADs.

Yet another type of selection criterion may depend on the characteristics of the persistent storage devices of the various D-HEADs, e.g., the type, speed and/or endurance of the D-HEAD storage devices. Further additionally or alternatively, the selection criterion evaluated by the I-HEAD may depend on any other suitable factor.

It is important to note that the D-HEADs are selected by the I-HEAD (the virtual head serving the requesting client) and not by the O-HEAD (the virtual head owning the metadata of the data object). The I-HEAD is very often in a better position to choose the D-HEADs than the O-HEAD, because it has better and more up-to-date information as to the expected end-to-end performance of the data paths (from the requesting client to the persistent storage devices associated with the D-HEADs). Since this information is local by nature and often changes rapidly over time, D-HEAD selection by the I-HEAD typically outperforms selection by the O-HEAD.

Having selected candidate D-HEADs 94, I-HEAD 86 sends respective speculative write commands 100 to the selected D-HEADs. Typically, each speculative write command comprises the data object to be stored, and an identifier (denoted WRITE_ID) that uniquely identifies the transaction. Write commands 100 are speculative in the sense that D-HEADs 94 do not commit them to persistent storage 40 until being instructed to do so by O-HEAD 90. Until receiving an instruction to commit, the D-HEAD typically caches the data object, e.g., in volatile memory 36 of the node.

In some embodiments, a given D-HEAD may write the data object to persistent storage 40 upon receipt, but not permanently, i.e., without logically committing the write command. The D-HEAD commits the write command only when instructed to do so by O-HEAD 90. In the present context, this sort of temporary storage in the persistent storage is also regarded as "caching."

In addition to sending the speculative write commands to D-HEADs 94, I-HEAD 86 sends a metadata update message 104 to O-HEAD 90 (the virtual head owning the metadata of the data object). Metadata update message 104 notifies O-HEAD 90 of the identities of the selected D-HEADs, and carries the same WRITE_ID as speculative write commands 100. In metadata update message 104, I-HEAD 86 may indicate, for example, the offset and length of the data written, and/or identifiers of the different data objects.

In response to metadata update message 104, O-HEAD sends respective commit instructions 108 to D-HEADs 94. The commit instructions carry the same WRITE_ID, and instruct the D-HEADs to commit the data object to the persistent storage. In some embodiments the commit instructions also carry metadata of the write transaction, to be stored together with the data object itself by the D-HEADs.

In response to receiving a commit instruction, each D-HEAD 94 identifies a cached data object that carries the same WRITE_ID, and commits the cached data object to the persistent storage (local storage device 40). In embodiments in which the commit request carries metadata to be stored with the data object, the D-HEAD combines the metadata with the data of the data object, and stores both data and metadata in the persistent storage.

Upon successfully committing the data object, each D-HEAD returns an acknowledgement (ACK) 112 having the transaction WRITE_ID to O-HEAD 90. When all the D-HEADs have acknowledged, the O-HEAD updates the metadata of the mapping unit in question to reflect the storage locations of the data object. The O-HEAD sends an ACK 116 to I-HEAD 86, which in turn reports successful completion of the transaction to the requesting client.

In alternative embodiments, the O-HEAD may notify I-HEAD 86 of partial success, as well, e.g., when only a subset of the D-HEADs have acknowledged successful storage. In another embodiment, D-HEADs 94 may send an ACK directly to I-HEAD 86, at the same time they send ACK 112 to O-HEAD 90. The ACKs from the D-HEADs to the I-HEAD would replace ACKs 116 from the O-HEAD to the I-HEAD. This solution reduces the overall transaction latency.

As can be seen from the description above, the selection of D-HEADs 94 is considered non-final until ACK 116 is received by I-HEAD 86. Various failure events during the transaction may cause I-HEAD 86 to change the selection. For example, one or more of the speculative write commands 100 may fail, e.g., because of congestion or equipment failure. As another example, O-HEAD 90 may fail to instruct one or more of the D-HEADs to commit the speculative write commands. Any such event, or any other suitable event, may trigger I-HEAD 86 to change the selection of D-HEADs, either partially or completely. As yet another example, writing to a certain D-HEAD may take too long, in which case the I-HEAD may write to an alternative D-HEAD, so as to ensure low average write latency.

In an example scenario, the I-HEAD may re-select the entire group of D-HEADs upon any failure, even if only a single D-HEAD has failed to store the data object. In another scenario, the I-HEAD may re-select only D-HEADs that have failed.

A given D-HEAD will not commit a speculative write command 100 unless it is followed by a corresponding commit instruction 108 from the O-HEAD. Therefore, the I-HEAD may re-select D-HEADs as desired, possibly multiple times, until finally selecting a well-performing set of D-HEADs. There is generally no need to notify a D-HEAD that it has been de-selected. The D-HEAD will typically delete cached speculative write commands that are aged, i.e., not followed by a commit instruction after a predefined time-out.

Note also that the data path between the I-HEAD and the D-HEADs does not pass through the O-HEAD. The O-HEAD exchanges only metadata and control messages with the I-HEAD and D-HEADs, while the actual data content for storage is sent directly from the I-HEAD to the D-HEADs.

The speculative writing process shown in FIG. 3 is an example process that is depicted purely for the sake of conceptual clarity. In alternative embodiments, any other suitable process can be used. Generally, any virtual head 56 in system 20 may serve as an I-HEAD for some write requests, as D-HEAD for some data objects 82, and as O-HEAD for the metadata of some mapping units 78. For a given write request, the I-HEAD, D-HEADs and O-HEAD are often different virtual heads, but not necessarily. For a given write transaction, a certain virtual head 56 may happen to serve as both I-HEAD and D-HEAD, as both I-HEAD and O-HEAD, as both D-HEAD and O-HEAD, or even serve all three roles.

In some embodiments, a given D-HEAD does not immediately commit cached data objects to persistent storage, even if it has received the corresponding commit instructions. The D-HEAD has the freedom to acknowledge a commit instruction but keep the data object cached until a later point in time. This freedom enables the D-HEAD to optimize the access to storage devices 40. For example, the D-HEAD may accumulate cached data objects (for which commit instructions have been received), and commit all of them at once.

Note that, if the D-HEAD acknowledges a commit instruction but keeps the data object cached and uncommitted, it should take measures not to lose the data in case of power interruption. For this purpose, the D-HEAD may cache the data object, for example, in SSD or NVRAM. In an alternative embodiment, the D-HEAD caches several commit instructions in RAM without acknowledging them. After combining multiple commit instructions and committing them to persistent storage, the D-HEAD sends acknowledgements for all these instructions. This solution increases the latency of the batched write, in return for reduced wearing of the persistent storage devices (e.g., Flash memory).

Although the embodiments described herein mainly address a distributed FS, the methods and systems described herein can also be used in various other applications in which data is written to some storage location but is accessible only after its respective metadata is updated, such as in some database applications.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for data storage, comprising:
running on multiple interconnected compute nodes respective virtual heads that collaboratively store files in persistent storage;
in response to receiving, in an initiator virtual head, a request to write at least a portion of a given file, selecting by the initiator virtual head one or more destination virtual heads for storing the portion;
sending the portion from the initiator virtual head to the selected destination virtual heads, and sending a notification of the selected destination virtual heads to an owner virtual head, which has been assigned to own metadata of the portion; and
in the destination virtual heads, caching the portion received from the initiator virtual head, and committing the portion to the persistent storage only in response to receiving a commit instruction from the owner virtual head.

2. The method according to claim 1, and comprising, in the owner virtual head, updating the metadata of the portion and sending the commit instruction to the selected destination virtual heads in response to the notification.

3. The method according to claim 1, wherein selecting the destination virtual heads comprises choosing a set of the virtual heads that are topologically close to the initiator virtual head.

4. The method according to claim 1, wherein selecting the destination virtual heads comprises choosing a set of the virtual heads that belong to different failure domains.

5. The method according to claim 1, wherein selecting the destination virtual heads comprises choosing a set of the virtual heads having non-congested network paths leading thereto from the initiator virtual head.

6. The method according to claim 1, wherein selecting the destination virtual heads comprises choosing a set of the virtual heads depending on at least one of:
actual loads on the virtual heads;
free persistent storage space remaining on the virtual heads;
respective latencies between the initiator virtual head and the virtual heads;
respective network queue depths to the virtual heads; and
characteristics of persistent storage devices of the virtual heads.

7. The method according to claim 1, wherein sending the portion comprises transferring the portion from the initiator virtual head to the destination virtual heads not via the owner virtual head.

8. The method according to claim 1, and comprising, in response to an event, re-selecting the destination virtual heads by the initiator virtual head, refraining from committing the portion by the originally-selected destination virtual heads, and instead committing the portion by the re-selected destination virtual heads.

9. The method according to claim 1, and comprising, in at least one of the destination virtual heads, delaying committing of the portion until accumulating multiple commit instructions for multiple respective cached portions of one or more files, and then committing the accumulated cached portions.

10. The method according to claim 1, wherein the commit instruction from the owner virtual head carries metadata for storage, and wherein committing the portion comprises storing both the portion and the metadata in the persistent storage.

11. A system for data storage, comprising multiple interconnected compute nodes, which are configured to run respective virtual heads that collaboratively store files in persistent storage, to receive in one of the virtual heads serving as an initiator virtual head a request to write at least a portion of a given file, to select by the initiator virtual head, from among the virtual heads, one or more destination virtual heads for storing the portion, to send the portion from the initiator virtual head to the selected destination virtual heads and to send a notification of the selected destination virtual heads to an owner virtual head, which has been assigned from among the virtual heads to own metadata of the portion, and, in the destination virtual heads, to cache the portion received from the initiator virtual head and to commit the portion to the persistent storage only in response to receiving a commit instruction from the owner virtual head.

12. The system according to claim 11, wherein the owner virtual head is configured to update the metadata of the portion and to send the commit instruction to the selected destination virtual heads in response to the notification.

13. The system according to claim 11, wherein the initiator virtual head is configured to select as the destination virtual heads a set of the virtual heads that are topologically close to the initiator virtual head.

14. The system according to claim 11, wherein the initiator virtual head is configured to select as the destination virtual heads a set of the virtual heads that belong to different failure domains.

15. The system according to claim 11, wherein the initiator virtual head is configured to select as the destination virtual heads a set of the virtual heads having non-congested network paths leading thereto from the initiator virtual head.

16. The system according to claim 11, wherein the initiator virtual head is configured to select as the destination virtual heads a set of the virtual heads depending on at least one of:
actual loads on the virtual heads;
free persistent storage space remaining on the virtual heads;
respective latencies between the initiator virtual head and the virtual heads;
respective network queue depths to the virtual heads; and
characteristics of persistent storage devices of the virtual heads.

17. The system according to claim 11, wherein the initiator virtual head is configured to send the portion to the destination virtual heads not via the owner virtual head.

18. The system according to claim 11, wherein, in response to an event, the initiator virtual head is configured to re-select the destination virtual heads, to cause the originally-selected destination virtual heads to refrain from committing the portion, and instead to cause the re-selected destination virtual heads to commit the portion.

19. The system according to claim 11, wherein at least one of the destination virtual heads is configured to delay committing of the portion until accumulating multiple commit instructions for multiple respective cached portions of one or more files, and then to commit the accumulated cached portions.

20. The system according to claim 11, wherein the commit instruction from the owner virtual head carries metadata for storage, and wherein the destination virtual heads are configured to store both the portion and the metadata in the persistent storage.

* * * * *